United States Patent [19]

Kurisu et al.

[11] Patent Number: 5,059,462
[45] Date of Patent: Oct. 22, 1991

[54] INFORMATION RECORDING MEDIUM

[75] Inventors: Masayoshi Kurisu; Hidehiko Hashimoto, both of Ichihara, Japan

[73] Assignee: Mitsui Petrochemical Industries, Ltd., Tokyo, Japan

[21] Appl. No.: 423,211

[22] Filed: Oct. 18, 1989

[30] Foreign Application Priority Data

Nov. 24, 1988 [JP] Japan ................. 63-296597

[51] Int. Cl.$^5$ .................................................. B32B 3/02
[52] U.S. Cl. ........................................ 428/64; 428/65;
428/913; 369/284; 369/288; 369/275.1;
346/766; 346/135.1
[58] Field of Search .................... 428/64, 65, 913;
369/275, 284, 288; 346/766, 135.1

[56] References Cited

U.S. PATENT DOCUMENTS 4,503,531  3/1985  Kato ...................................... 369/275
4,751,124  6/1988  Matsuzawa et al. ................. 428/65
4,876,557  10/1989  Yabe ..................................... 346/137

FOREIGN PATENT DOCUMENTS 362669  4/1990  European Pat. Off. .
62-88154  4/1987  Japan .

Primary Examiner—Patrick J. Ryan
Attorney, Agent, or Firm—Sherman and Shalloway

[57]  ABSTRACT

In an information recording medium having laminated two disc substrates by an adhesive, each disc substrate comprising a substrate and a recording layer, so that the recording layers are disposed opposite to each other, this invention provides an information recording medium wherein said adhesive is a hot melt adhesive having a softening point of 130° C. or more. Said information recording medium forms no deviation beteween two laminated disc substrates thereof and decreased deformation such as warpage even when exposed to an atmosphere at high temperature and humidity for a long time.

10 Claims, 2 Drawing Sheets

INFORMATION RECORDING MEDIUM

FIELD OF THE INVENTION

This invention relates to an information recording medium used an optical disc or such similar device, and more particularly to an optical information recording medium comprising two disc substrates laminated together with an adhesive (hereinafter abbreviated as a two disc information recording medium).

BACKGROUND OF THE INVENTION

It is known an information recording medium comprising a substrate and a recording layer capable of writing or reading out information by focusing light such as laser beam onto the recording layer. It is also known information recording medium having laminated two disc substrated by an adhesive, each disc substrates comprising a substrate and a recording layer, so that the recording layers are disposed opposite to each other.

Adhesives used for laminating two disc substrates include a UV-curing adhesive, a double coated adhesive tape, a cold setting adhesive and a hot melt adhesive. Generally speaking, two disc information recording media laminated with a UV-curing adhesive or those laminated with a double coated adhesive tape have such problems that they receive serious deformation such as warpage, cracks and corrosion holes, and moreover, are poor in adhesive strength. Furthermore, a two disc information recording medium laminated with a double coated adhesive tape has such a problem that air comes in between the laminated surfaces formed by the tape and the recording medium layers of the discs of the medium. On the contrary, a two disc recording medium laminated with a cold setting adhesive is excellent in appearance and in adhesive strength, but has such a drawback that the medium itself receives deformation such as warpage.

On the other hand, a two disc information recording medium laminated with a hot melt adhesive applied on the surface disc substrates by way of a roll coater, etc. is excellent in appearance and adhesive strength, and moreover, deformation such as warpage received in the medium is much smaller as compared with a two disc information recording medium laminated with the aforementioned adhesives other than the hot melt adhesive. Therefore, hot melt adhesives have attracted much attention since they are expected to be quite promising in the future. However, a two disc information recording medium laminated with the hot melt adhesive has such problems that when the recording medium is kept in high temperature and high humidity conditions (for example, in conditions where the temperature is 70° C. and the humidity is 80%) for a long time (for example, 300 hours), deviation takes place between the two laminated disc substrates or the deformation of the medium such as warpage tends to be serious.

OBJECT OF THE INVENTION

This invention is intended to solve the above mentioned problems, and the object of the invention is to provide an information recording medium comprising two laminated disc substrates where no deviation takes place or the deformation of the medium such as warpage is small even when said recording medium is exposed to high temperature and high humidity conditions for a long time.

SUMMARY OF THE INVENTION

An information recording medium according to the present invention comprises two disc substrates, each substrate comprising a transparent resin substrate and a recording layer formed on one surface of each resin substrate laminated with an adhesive so that the recording layers are disposed opposite to each other, wherein the adhesive used is a hot melt adhesive having a softening point of 130° C. or more.

An adhesive used in the invention preferably comprises (A) a polyolefin, (B) a styrene and (C) a petroleum resin.

In each of the figures, the identical numeral references show the identical or corresponding parts, and 1 represents the information recording medium, 2a and 2b indicate the disc substrates, 3a and 3b indicate the recording layers, 4 indicates the adhesive layer, 6a and 6b indicate the transparent resin substrates, 12 is the hopper, and 20 and 21 respectively indicate the fixed lower mold and the movable upper of a cold pressing machine.

DETAILED DESCRIPTION OF THE INVENTION

Hereinafter, the information recording medium of this invention is illustrated in more detail.

Figure 1:
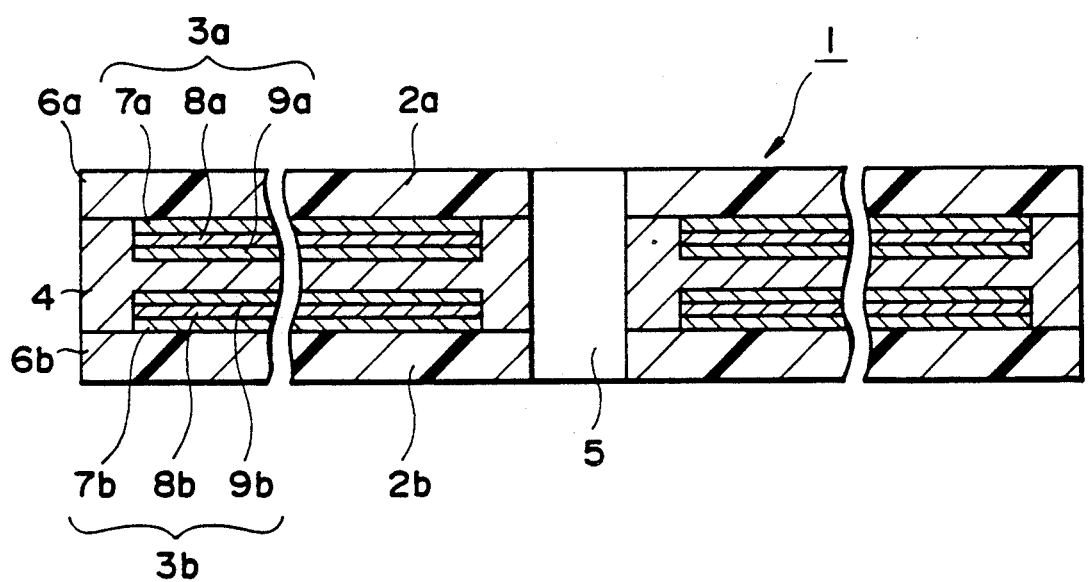
FIG. 1 shows a sectional view of the information recording medium of this invention.

The information recording medium of this invention has a structure shown in FIG. 1 wherein a disc substrate 2a comprising a recording layer 3a and a transparent resin substrate 6a, and a disc substrate 2b comprising a recording layer 3b and a transparent resin substrate 6b which are laminated with an adhesive layer 4 so that the recording layers 3a and 3b are disposed opposite to each other, and the above information recording medium has the center hole 5. The disc substrate 2a comprises, as described above, the transparent resin substrate 6a and the recording layer 3a being formed on the inner surface of the transparent resin substrate 6a, and the recording layer 3a comprises, for example, an enhancement film 7a, an optical recording layer 8a and a light reflection layer 9a. In some cases, the recording layer 3a may be a four-layer structure comprising a first enhancement film, an optical recording layer, a second enhancement film, and a light reflection layer. The structure of the disc substrate 2b is identical to that of the disc substrate 2a.

The enhancement film may be composed of silicon nitride or silicon nitride containing material.

The transparent resin substrate 6 is preferably composed of an organic polymer material such as polymethyl methacrylate, polycarbonate, a polymer alloy of polycarbonate and polystyrene, amorphous polyolefins as described in U.S. Pat. No. 4,614,778, poly(4-methyl-1-pentene), epoxy resins, polyethersulfone, polysulfone, polyetherimide and copolymers of ethylene and tetracyclododecene. Of these, copolymers of ethylene and cycloolefin as described hereinafter are particularly preferred.

Namely, the substrate 6 is preferably composed of a random copolymer of ethylene and at least one cycloolefin of the general formula [I], said copolymer having an intrinsic viscosity [η] of from 0.01 to 10 dl/g as measured in decalin at a temperature of 135° C., and a softening temperature (TMA) of at least 70° C.

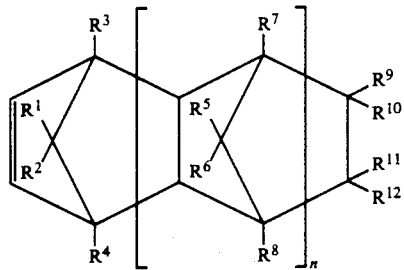

[I]

In the general formula [I], n is 0 or a positive integer preferably not more than 3, $R^1$ to $R^{12}$ are the same or different, and each represents a hydrogen or halogen atom or a hydrocarbon group, provided that $R^9$ to $R^{12}$, when combined together, may form a mono- or polycyclic hydrocarbon ring which may optionally have a double bond or bonds, or provided that $R^9$ and $R^{10}$ or $R^{11}$ and $R^{12}$, when taken together, may form an alkylidene group.

In the polymer chain of the random copolymer, the component derived from the cycloolefins of the general formulas [I] is present in the form of recurring units as represented by the following general formula [II].

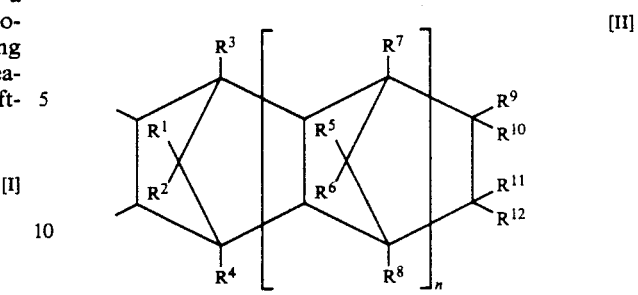

[II]

The cycloolefins represented by the general formula [I] can be easily prepared by a condensation reaction of cyclopentadienes with appropriate olefins by Diels-Alder reaction.

Examples of the cycloolefins represented by the general formula [I] include such compounds as exemplified in Table 1, and in addition to 1,4,5,8-dimethano-1,2,3,4,4a,5,8,8a-octahydronaphthalene, such octahydronaphthalenes as 2-methyl-1,4,5,8-dimethano-1,2,4,4a,5,8,8a-octahydronaphthalene, 2-ethyl-1,4,5,8-dimethano-1,2,3,4a,5,8,8a-octahydronaphthalene, 2-propyl-1,4,5,8-dimethano-1,2,3,4a,5,8,8a-octahydronaphthalene, 2-hexyl-1,4,5,8-dimethano-1,2,3,4a,5,8,,8a-octahydronaphthalene, 2-stearyl-1,4,5,8-dimethano-1,2,3,4a,5,8,8a-octahydronaphthalene, 2,3-dimethyl-1,4,5,8-dimethano-1,2,3,4a,5,8,8a-octahydronaphthalene, 2-methyl-3-ethyl-1,4,5,8-dimethano-1,2,3,4a,5,8,,8a-octahydronaphthalene, 2-chloro-1,4,5,8-dimethano-1,2,3,4a,5,8,8a-octahydronaphthalene, 2-bromo-1,4,5,8-dimethano-1,2,3,4a,5,8,8a-octahydronaphthalene, 2-fluoro-1,4,5,8-dimethano-1,2,3,4a,5,8,8a-octahydronaphthalene, 2,3-dichloro-1,4,5,8-dimethano-1,2,3,4a,5,8,8a-octahydronaphthalene, 2-cyclohexyl-1,4,5,8-dimethano-1,2,3,4a,5,8,8a-octahydronaphthalene, 2-n-butyl-1,4,5,8-dimethano-1,2,3,4a,5,8,8a-octahydronaphthalene, and 2-isobutyl-1,4,5,8-dimethano-1,2,3,4a,5,8,8a-octahydronaphthalene,

TABLE 1

| Chemical formula | Compound name |
|---|---|
|  | Bicyclo[2,2,1]hept-2-ene |
| —CH₃ | 6-Methylbicyclo[2,2,1]hept-ene |
| —CH₃ —CH₃ | 5,6-Dimethylbicyclo[2,2,1]hept-2-ene |
| CH₃ | 1-Methylbicyclo[2,2,1]hept-2-ene |
| —C₂H₅ | 6-Ethylbicyclo[2,2,1]hept-2-ene |

TABLE 1-continued

| Chemical formula | Compound name |
|---|---|
| 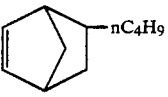 nC₄H₉ | 6-Butylbicyclo[2,2,1]hept-2-ene |
| 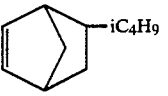 iC₄H₉ | 6-Isobutylbicyclo[2,2,1]hept-2-ene |
| 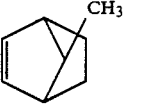 CH₃ | 7-Methylbicyclo[2,2,1]hept-2-ene |
|  | Tetracyclo[4,4,0,1$^{2.5}$,1$^{7.10}$]-3-dodecene |
|  CH₃ | 8-Methyltetracyclo[4,4,0, 1$^{2.5}$,1$^{7.10}$]-3-dodecene |
| 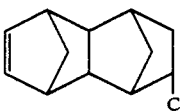 C₂H₅ | 8-Ethyltetracyclo[4,4,0, 1$^{2.5}$,1$^{7.10}$]-3-dodecene |
| 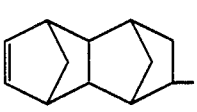 C₃H₇ | 8-Propyltetracyclo[4,4,0, 1$^{2.5}$,1$^{7.10}$]-3-dodecene |
| 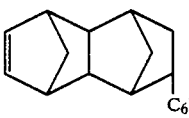 C₆H₁₃ | 8-Hexyltetracyclo[4,4,0, 1$^{2.5}$,1$^{7.10}$]-3-dodecene |
| 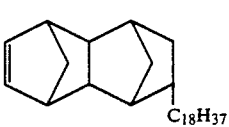 C₁₈H₃₇ | 8-Stearyltetracyclo[4,4,0, 1$^{2.5}$,1$^{7.10}$]-3-dodecene |
|  CH₃ CH₃ | 8,9-Dimethyltetracyclo[4,4,0, 1$^{2.5}$,1$^{7.10}$]-3-dodecene |
| 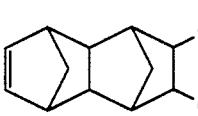 CH₃ C₂H₅ | 8-Methyl-9-ethyltetracyclo[4,4,0, 1$^{2.5}$,1$^{7.10}$]-3-dodecene |
| 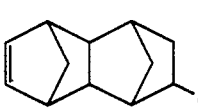 Cl | 8-Chlorotetracyclo[4,4,0, 1$^{2.5}$,1$^{7.10}$]-3-dodecene |

TABLE 1-continued

| Chemical formula | Compound name |
|---|---|
| 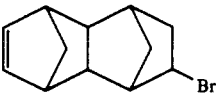 | 8-Bromotetracyclo[4,4,0,1$^{2.5}$,1$^{7.10}$]-3-dodecene |
| 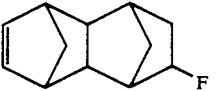 | 8-Fluorotetracyclo[4,4,0,1$^{2.5}$,1$^{7.10}$]-3-dodecene |
| 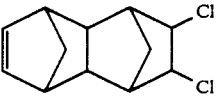 | 8,9-Dichlorotetracyclo[4,4,0,1$^{2.5}$,1$^{7.10}$]-3-dodecene |
| 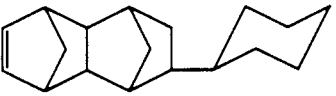 | 8-Cyclohexyltetracyclo[4,4,0,1$^{2.5}$,1$^{7.10}$]-3-dodecene |
| 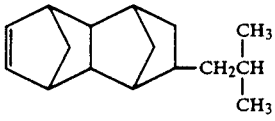 | 8-Isobutyltetracyclo[4,4,0,1$^{2.5}$,1$^{7.10}$]-3-dodecene |
| 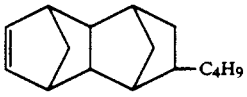 | 8-Butyltetracyclo[4,4,0,1$^{2.5}$,1$^{7.10}$]-3-dodecene |
|  | 8-Ethylidenetetracyclo[4,4,0,1$^{2.5}$,1$^{7.10}$]-3-dodecene |
|  | 8-Ethylidene-9-methyltetracyclo[4,4,0,1$^{2.5}$,1$^{7.10}$]-3-dodecene |
|  | 8-Ethylidene-9-ethyltetracyclo[4,4,0,1$^{2.5}$,1$^{7.10}$]-3-dodecene |
|  | 8-Ethylidene-9-isopropyltetracyclo[4,4,0,1$^{2.5}$,1$^{7.10}$]-3-dodecene |
| 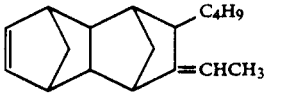 | 8-Ethylidene-9-butyltetracyclo[4,4,0,1$^{2.5}$,1$^{7.10}$]-3-dodecene |
| 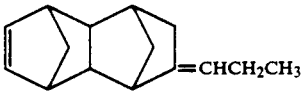 | 8-n-Propylidenetetracyclo[4,4,0,1$^{2.5}$,1$^{7.10}$]-3-dodecene |
|  | 8-n-Propylidene-9-methyltetracyclo[4,4,0,1$^{2.5}$,1$^{7.10}$]-3-dodecene |

TABLE 1-continued

| Chemical formula | Compound name |
|---|---|
| [structure with C₂H₅ and =CHCH₂CH₃] | 8-n-Propylidene-9-ethyltetracyclo[4,4,0,1$^{2.5}$,1$^{7.10}$]-3-dodecene |
| [structure with CH(CH₃)₂ and =CHCH₂CH₃] | 8-n-Propylidene-9-isopropyltetracyclo[4,4,0,1$^{2.5}$,1$^{7.10}$]-3-dodecene |
| [structure with C₄H₉ and =CHCH₂CH₃] | 8-n-Propylidene-9-butyltetracyclo[4,4,0,1$^{2.5}$,1$^{7.10}$]-3-dodecene |
| [structure with =C(CH₃)CH₃] | 8-Isopropylidenetetracyclo[4,4,0,1$^{2.5}$,1$^{7.10}$]-3-dodecene |
| [structure with CH₃ and =C(CH₃)CH₃] | 8-Isopropylidene-9-methyltetracyclo[4,4,0,1$^{2.5}$,1$^{7.10}$]-3-dodecene |
| [structure with C₂H₅ and =C(CH₃)CH₃] | 8-Isopropylidene-9-ethyltetracyclo[4,4,0,1$^{2.5}$,1$^{7.10}$]-3-dodecene |
| [structure with CH(CH₃)₂ and =C(CH₃)CH₃] | 8-Isopropylidene-9-isopropyltetracyclo[4,4,0,1$^{2.5}$,1$^{7.10}$]-3-dodecene |
| [structure with C₄H₉ and =C(CH₃)CH₃] | 8-Isopropylidene-9-butyltetracyclo[4,4,0,1$^{2.5}$,1$^{7.10}$]-3-dodecene |
| [structure with two CH₃] | 5,10-Dimethyltetracyclo[4,4,0,1$^{2.5}$,1$^{7.10}$]-3-dodecene |
| [structure with two CH₃] | 2,10-Dimethyltetracyclo-[4,4,0,1$^{2.5}$,1$^{7.10}$]-3-dodecene |
| [structure with two CH₃] | 11,12-Dimethyltetracyclo-[4,4,0,1$^{2.5}$,1$^{7.10}$]-3-dodecene |

TABLE 1-continued

| Chemical formula | Compound name |
|---|---|
| | 2,7,9-Trimethyltetracyclo-[4,4,0,1$^{2.5}$,1$^{7.10}$]-3-dodecene |
| | 9-Ethyl-2,7-dimethyltetracyclo-[4,4,0,1$^{2.5}$,1$^{7.10}$]-3-dodecene |
| | 9-Isobutyl-2,7-dimethyltetracyclo-[4,4,0,1$^{2.5}$,1$^{7.10}$]-3-dodecene |
| | 9,11,12-Trimethyltetracyclo-[4,4,0,1$^{2.5}$,1$^{7.10}$]-3-dodecene |
| | 9-Ethyl-11,12-dimethyltetracyclo-[4,4,0,1$^{2.5}$,1$^{7.10}$]-3-dodecene |
| | 9-Isobutyl-11,12-dimethyltetracyclo-[4,4,0,1$^{2.5}$,1$^{7.10}$]-3-dodecene |
| | 5,8,9,10-Tetramethyltetracyclo-[4,4,0,1$^{2.5}$,1$^{7.10}$]-3-dodecene |
| | Hexacyclo[6,6,1,1$^{3.6}$,1$^{10.13}$,0$^{2.7}$,0$^{9.14}$]-4-heptadecene |
| | 12-Methylhexacyclo[6,6,1,1$^{3.6}$,1$^{10.13}$,0$^{2.7}$,0$^{9.14}$]-4-heptadecene |
| | 12-Ethylhexacyclo[6,6,1,1$^{3.6}$,1$^{10.13}$,0$^{2.7}$,0$^{9.14}$]-4-heptadecene |
| | 12-Isobutylhexacyclo[6,6,1,1$^{3.6}$,1$^{10.13}$,0$^{2.7}$,0$^{9.14}$]-4-heptadecene |

TABLE 1-continued

| Chemical formula | Compound name |
|---|---|
| | 1,6,10-Trimethyl-12-isobutyl-hexacyclo[6,6,1,1$^{3.6}$,1$^{10.13}$,0$^{2.7}$,0$^{9.14}$]-4-heptadecene |
| | Octacyclo[8,8,0,1$^{2.9}$,1$^{4.7}$,1,$^{11.18}$,1$^{13.16}$,0$^{3.8}$,0$^{12.17}$]-5-docosen |
| | 15-Methyloctacyclo[8,8,0,1$^{2.9}$,1$^{4.7}$,1,$^{11.18}$,1$^{13.16}$,0$^{3.8}$,0$^{12.17}$]-5-docosen |
| | 15-Ethyloctacyclo[8,8,0,1$^{2.9}$,1$^{4.7}$,1,$^{11.18}$,1$^{13.16}$,0$^{3.8}$,0$^{12.17}$]-5-docosen |
| | Pentacyclo[6,6,1,1$^{3.6}$,0$^{2.7}$,0$^{9.14}$]-4-hexadecene |
| | 1,3-Dimethylpentacyclo[6,6,1,1$^{3.6}$,0$^{2.7}$,0$^{9.14}$]-4-hexadecene |
| | 1,6-Dimethylpentacyclo[6,6,1,1$^{3.6}$,0$^{2.7}$,0$^{9.14}$]-4-hexadecene |
| | 15,16-Dimethylpentacyclo[6,6,1,1$^{3.6}$,0$^{2.7}$,0$^{9.14}$]-4-hexadecene |
| | Pentacyclo[6,5,1,1$^{3.6}$,0$^{2.7}$,0$^{9.13}$]-4-pentadecene |
| | 1,3-Dimethylpentacyclo[6,5,1,1$^{3.6}$,0$^{2.7}$,0$^{9.13}$]-4-pentadecene |
| | 1,6-Dimethylpentacyclo[6,5,1,1$^{3.6}$,0$^{2.7}$,0$^{9.13}$]-4-pentadecene |

TABLE 1-continued

| Chemical formula | Compound name |
|---|---|
| | 14,15-Dimethylpentacyclo[6,5,1,1$^{3.6}$, 0$^{2.7}$,0$^{9.13}$]-4-pentadecene |
| | Heptacyclo[8,7,0,1$^{2.9}$,1$^{4.7}$,1$^{11.17}$, 0$^{3.8}$,0$^{12.16}$]-5-icosene |
| | Heptacyclo[8,8,0,1$^{2.9}$,1$^{4.7}$,1$^{11.18}$, 0$^{3.8}$,0$^{12.17}$]-5-henicosene |
| | Pentacyclo[6,5,1,1$^{3.6}$, 0$^{2.7}$,0$^{9.13}$]-4,10-pentadecadiene |
| | Tricyclo[4,3,0,1$^{2.5}$]-3-decene |
| | 2-Methyl-tricyclo[4,3,0,1$^{2.5}$]-3-decene |
| | 5-Methyl-tricyclo[4,3,0,1$^{2.5}$]-3-decene |
| | Tricyclo[4,4,0,1$^{2.5}$]-3-undecene |
| | 10-Methyl-tricyclo[4,4,0,1$^{2.5}$]-3-undecene |
| | Pentacyclo[4,7,0,1$^{2.5}$,0$^{8.13}$,1$^{9.12}$]-3-pentadecene |
| | Methyl-substituted pentacyclo [4,7,0,1$^{2.5}$,0$^{8.13}$,1$^{9.12}$]-3-pentadecene |
| | Heptacyclo[7,8,0,1$^{3.6}$,0$^{2.7}$,1$^{10.17}$, 0$^{11.16}$,1$^{12.15}$]-4-icosene |

TABLE 1-continued

| Chemical formula | Compound name |
| --- | --- |
| (structure with two CH₃ groups) | Dimethyl-substituted heptacyclo [7,8,0,1$^{3.6}$,0$^{2.7}$,1$^{10.17}$,0$^{11.16}$,1$^{12.15}$]-4-icosene |
| (structure) | Nonacyclo[9,10,1,1$^{4.7}$,0$^{3.8}$,0$^{2.10}$,0$^{12.21}$, 1$^{13.20}$,0$^{14.19}$,1$^{15.18}$]-5-pentacosene |
| (structure with three CH₃ groups) | Trimethyl-substituted nonacyclo [9,10,1,1$^{4.7}$,0$^{3.8}$,0$^{2.10}$,0$^{12.21}$,1$^{13.20}$, 0$^{14.19}$,1$^{15.18}$]-5-pentacosene |

While the random copolymer comprises a first component derived from ethylene and a second component derived from at least one cycloolefin of the general formula [I], as the essential constituent components, if desired, it may further comprise a third component derived from at least one other copolymerizable monomer in such a range that they do not mar the object of the invention namely in an amount of up to an epimolar to that of the first component contained in the copolymer. Monomers which can be used to form the third component include, for example, alpha-olefins having from 3 to 20 carbon atoms such as propylene, 1-butene, 4-methyl-1-pentene, 1-hexane, 1-octene, 1-decene, 1-dodecene, 1-tetradecene, 1-hexadecene, 1-octadecene and 1-eicocene.

In the copolymer, the recurring units (a) derived from ethylene are present in an amount of from 40 to 85% by mole, preferably from 50 to 75% by mole, while the recurring units (b) of the general formula [II] from the cycloolefin or cycloolefins are present in an amount of from 15 to 60% by mole, preferably from 25 to 50% by mole, and these recurring units (a) and (b) are arranged in the copolymer substantially at random. The molar percentage of the recurring units (a) and (b) were determined by $^{13}$C-NMR. The fact that the copolymer is completely soluble in decalin at a temperature of 135° C., that it is substantially linear and free from a gel-forming cross-linked structure.

The copolymer has an intrinsic viscosity [η] of from 0.01 to 10 dl/g, preferably from 0.05 to 5 dl/g, as measured in decalin at a temperature of 135° C.

The softening temperature (TMA) of the copolymer, as measured by a thermal mechanical analyzer is at least 70° C., preferably from 90° C. to 250° C., and more preferably from 100° C. to 200° C.

The softening temperature (TMA) of the copolymer was determined by monitoring thermal deformation behavior of a 1 mm sheet of the copolymer using a thermomechanical analyzer supplied by Du Pont. More specifically, a quartz needle was vertically placed on the sheet under a load of 49 g and the assembly was heated at a rate of 5° C./min. The temperature at which the needle penetrated into the sheet by a depth of 0.635 mm was taken as the softening temperature of the copolymer.

The copolymer has a glass transition temperature (Tg) of normally from 50° C. to 230° C., and preferably from 70° C. to 210° C.

The crystallinity of the copolymer, as measured by X-ray diffractomery, is normally from 0 to 10%, preferably from 0 to 7%, and more preferably from 0 to 5%.

The copolymers having the physical properties specified above may be used alone as the substrate resin. In some cases the copolymers may be used with some other copolymers such as copolymers of ethylene and a cycloolefin having a softening point of less than 70° C., more specifically from −10° to 60° C., and an intrinsic viscosity [η] of 0.5 to 5 dl/g as measured in decalin at a temperature of 135° C. In this case, the overall physical properties are preferably within the above range.

The above random copolymers of ethylene and a cycloolefin may be prepared, for examples, according to the methods proposed by this applicant in Japanese Patent L-O-P Publn. Nos. 168708/1985, 120816/1986, 115912/1986, 115916/1986, 271308/1986, 272216/1986, 252406/1987 and 252407/1987 by selecting conditions.

Each of these resins may be used alone or in combination.

Furthermore, the substrates of the optical discs according to the invention may be made of polymers having recurring units of the general formula [III] resulting from the ring opening of the cycloolefin monomers [I], or polymers having recurring units of the general formula [IV] resulting from hydrogenation of the units [III].

[III]

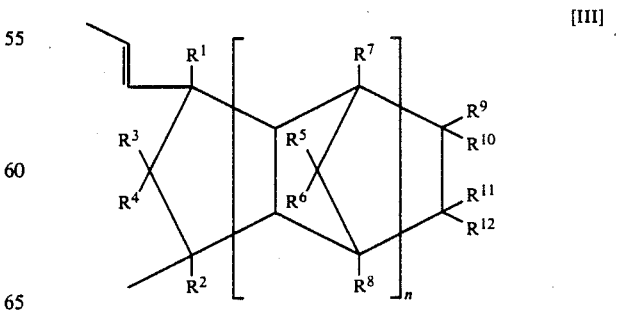

-continued

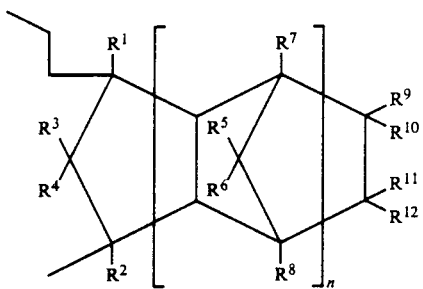

[IV]

In the general formula [III] or [IV], n and $R^1$ $R^{12}$ are as defined above.

These resins may be formed into transparent resin substrates having desired shapes by a conventional molding method such as injection molding.

The recording layers laminated on the transparent substrates are composed of optical memory layers, for example, comprising Tb.Fe.Co or Tb.Fe.Co containing Pt or Pd, and if necessary a undercoat layers, a light reflection prevention layer, a light reflection layer, an interface layer and a protection layer, all of which are laminated on the upper or lower surfaces of the optical memory layers.

An adhesive used in the information recording medium according to this invention is a hot melt adhesive having a softening point of not lower than 130° C., preferably above 140° C., and this adhesive is heated to melt for coating onto the disc substrates and is hardened when cooled. The softening temperature is measured in accordance with ASTM E 2867 (Ring and Ball Method). The heating temperature of the adhesive for melting is preferably lower than a temperature that causes deformation of the substrate.

The hot melt adhesive preferably comprises a polyolefin (A), a styrene resin (B) and a petroleum resin (C).

The polyolefin (A) used in the hot melt adhesive is preferably a copolymer of ethylene, propylene and alpha-olefin. The alpha-olefins preferably have from 4 to 20 carbon atoms and include, for example, 1-butene, 4-methyl-1-pentene, 1-octene, etc. Such ethylene/propyrene/alpha-olefin terpolymer preferably comprises from 5 to 80% by weight, particularly from 10 to 70% by weight of ethylene units, from 5 to 80% by weight, particularly from 10 to 70% weight of propylene units, and from 5 to 90%, particularly from 10 to 80% by weight of alpha-olefin units.

The polyolefin (A) used in the hot melt adhesive may also be an ethylene/propylene copolymer. The ethylene content of ethylene/propylene copolymer (A) is preferably from 5 to 80% by weight, and especially preferably from 5 to 50% by weight. Said ethylene-propylene copolymer (A) may partly be modified with an unsaturated carboxylic acid or derivatives thereof. The modification of said copolymer may be performed by a copolymerization or graft copolymerization. The unsaturated carboxylic acid or derivatives thereof include, for example, an unsaturated carboxylic acid such as acrylic acid, methacrylic acid, maleic acid, fumaric acid, tetrahydrophthalic acid, itaconic acid, citraconic acid, crotonic acid, isocrotonic acid, and Nadic Acid (trade name) and (endo-cis-bicyclo[2.2.1]hept-5-ene-2,3-dicarboxylic acid); an acid halide such as maleyl chloride; an amide; an imide such as maleimide; an anhydride such as itaconic anhydride, maleic anhydride, and citraconic anhydride; and an ester such as monomethyl maleate, dimethyl maleate, and glycidyl maleate. Among these compounds, an unsaturated dicarboxylic acid or the anhydride thereof, especially maleic acid or maleic anhydride is preferably employed. As for the modifying amount, the modified copolymer preferably contains from 0.1 to 5% by weight of an unsaturated carboxylic acid or the derivative thereof.

The polyolefin (A) used herein includes polypropylene such as propylene homopolymer, and copolymer of propylene with another comonomer. Of those a random type polypropylene, especially ethylene-propylene random copolymer containing from 1 to 20% by weight of an ethylene component as a comonomer is preferable.

The styrene resin (B) used herein is a polymer containing at least styrene units or its derivatives units, and includes, in the concrete, polystyrene, styrene/acrylonitrile copolymer, styrene/alpha-methylstyrene copolymer, styrene/maleic anhydride copolymer, styrene/methyl methacrylate copolymer, styrene/N-phenylmaleimide copolymer, styrene/alpha-methylstyrene/acrylonitrile terpolymer, styrene/acrylonitrile/methyl methacrylate terpolymer, styrene/maleic anhydride/acrylonitrile terpolymer and styrene/N-phenylmaleimide copolymer. The styrene resin (B) further includes the so-called ABS resin, AES resin and AAS resin blended with a rubber component such as polybutadiene, ethylene/propylene copolymer rubber or acrylic rubber.

A styrene resin (B) preferably has a glass transition temperature (Tg) of from 50° to 200° C., preferably from 70° to 150° C., and a melt flow rate (ASTM D1238) at 200° C., 2.16 kg load of 0.05 to 100 g/10 minutes, preferably 0.1 to 50 g/10 minutes.

The petroleum resin (C) used herein is a resin prepared by copolymerizing olefin fractions having not less than 5 carbon atoms obtained from petroleum naphtha decomposition product and include, in the concrete, a copolymer of an aliphatic olefin and an aromatic olefin, these olefins being once separated and copolymerized and a copolymer of an aliphatic olefin and an aromatic olefin, these olefins being polymerized without separation. In the present invention, a conventionally known petroleum resin can be used.

A petroleum resin (C) preferably has number average molecular weight of 5000 or less, preferably from 50 to 3000.

The polyolefin hot melt adhesive may further contain some components in addition to components (A), (B) and (C).

The polyolefin hot melt adhesive comprises from 1 to 60% by weight, preferably from 5 to 40% by weight of the polyolefin (A), from 1 to 30% by weight, preferably from 5 to 20% by weight of the styrene resin (B) and from 30 to 95% by weight, preferably from 50 to 90% by weight of the petroleum resin (C).

The softening point of the hot melt adhesive is 130° C. or more, preferably 140° C. or more, and more preferably 141° C. or more. Furthermore, the melt viscosity of the hot melt adhesive at 150° C. is preferably 90,000 cPs or more.

The information recording medium according to this invention comprising two disc substrates, each substrate comprising a transparent resin substrate and a recording layer formed on one surface of said substrate, said disc substrates being laminated together with an adhesive usually has a hub 5 at the center of the disc.

The information recording medium according to this invention includes every medium that can record information to its recording layers such as recording optical discs and flexible optical discs.

The information recording medium according to this invention is produced by laminating two disc substrates, each disc substrate comprising a substrate and a recording layer, so that the recording layers are disposed opposite to each other after have been coated with an adhesive.

The information recording medium thus manufactured shows no deviation between the two substrates and decreased warpage even when said recording medium is used under conditions at high temperature and high humidity for a long time, because the two substrates are laminated with a hot melt adhesive having a softening point of 130° C. or more.

Hereinafter, processes for manufacturing an information recording medium according to the present invention are described.

Figure 2:
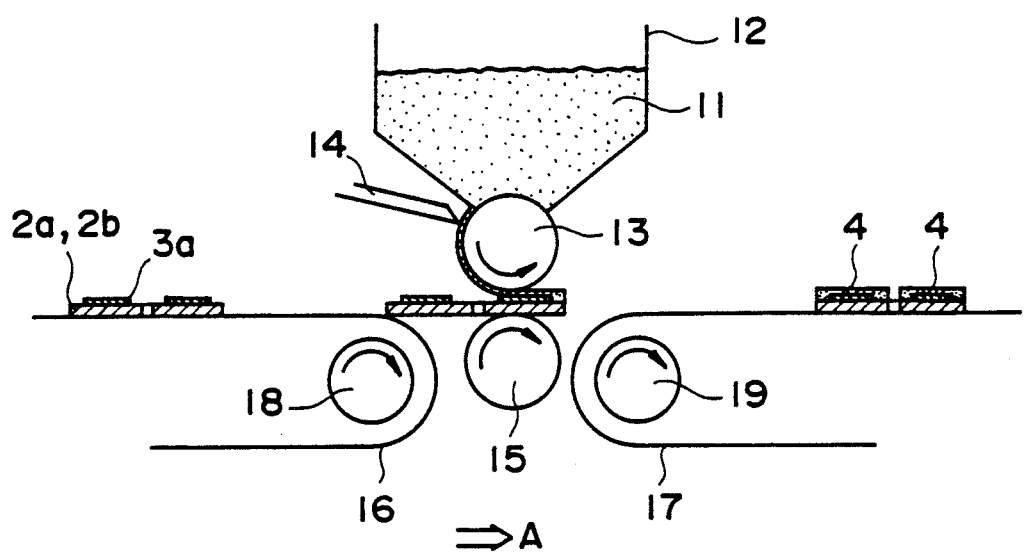
FIGS. 2 and 3 shows production steps for manufacturing the recording medium of this invention.
Figure 3:
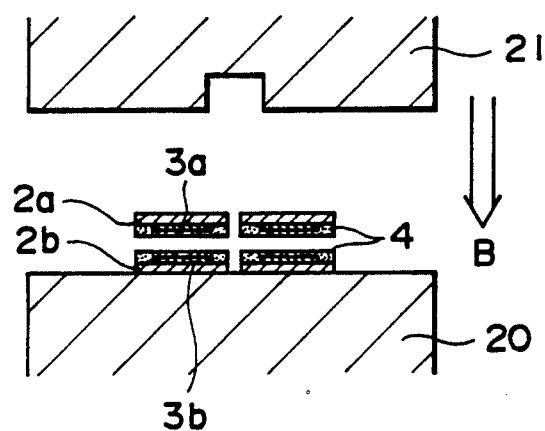

FIG. 2(a) shows a process wherein a hot melt adhesive is applied onto a recording layer side of disc substrate by a roll coater, and FIG. 2(b) shows a process wherein disc substrates coated with the hot melt adhesive are compressed and laminated by a cold press.

In FIG. 2(a), a hot melt adhesive 11 in a non-molten state is heated and melted, and stored in a tank 12. A roller 13 for coating is arranged just under the opening of said tank 12, and a film thickness-adjusting plate 14 for controlling adhesive film thickness is arranged at the upper part on the down rotation side of said roller 13. A feeding roller 15 is arranged under said roller 13, and rotates in a direction reverse to that of said roller 13. Conveyors 16, 17 having a level identical to that of said roller 15 are placed on both sides of said roller 15, and conveyor rollers 18, 19 drive said conveyors 16, 17, respectively in the direction A. In FIG. 2(b), a fixed mold 20 and a movable mold 21 are shown.

A disc substrate 2a having a recording layer 3a on the upper surface thereof is placed on said conveyor 16, transferred by said conveyor 16 in the direction A, and passed through a gap between said roller 13 and said roller 15. Said roller 13 begins to rotate simultaneously with the rotation of said roller 15 caused by the contact of substrate 2a, and said substrate 2a is coated with said adhesive 11 to form an adhesive layer 4. Said adhesive 11 is now in a molten state in said hopper 12, and is fed from said tank 12 by the rotation of said roller 13, said substrate 2a thus being coated with said adhesive 11. The thickness of said adhesive layer 4 can be controlled by controlling the space between said film thickness-adjusting plate 14 and said roller 13. Said substrate 2a whereon said adhesive layer 4 having a constant film thickness is formed is transferred in the direction A by the rotation of said roller 15, and further transferred by said conveyor 17. A disc substrate 2b is coated with an adhesive 11 to form an adhesive layer 4 by the same procedure as described above.

Disc substrates 2a, 2b are placed on said fixed mold 20 of the cold press in FIG. 2(b), and compressed and bonded together by moving said movable upper mold 21 in the direction B. Said disc substrates 2a, 2b are laminated to give an information recording medium 1 when said adhesive layer 4 is cooled below the melting point of said adhesive 11 to be cured.

EXPERIMENTAL EXAMPLE

Information recording mediums were prepared with various adhesives, and the appearance and warpage (mrad) of the resulting recording media were evaluated after a weathering test at 70° C. and humidity 85% for 300 hours.

EXPERIMENTAL EXAMPLE 1

A hot melt adhesive used herein contained 21% by weight of an ethylene/propylene/1-butene terpolymer (ethylene/propylene/1-butene=25/35/40 by weight %), 10% by weight of polystyrene having a glass transition temperature (Tg) of 110° C. and a melt flow rate (MFR 200° C.) of 25 g/10-minutes, and 69% by weight of a petroleum resin having number average molecular weight of 2,000, and had a softening point of 145° C. and a melting viscosity of 250,000 cPs at 150° C.

The substrates were formed from a transparent resin, the resin is a copolymer of ethylene and 1,4,5,8-dimethano-1,2,3,4,4a,5,8,8a-octahydronaphthalene containing 62 mole % of ethylene determined by $^{13}$C-NMR, and having a melt flow rate (MFR 260° C.) of 35 g/10 minutes, an intrinsic viscosity $[\eta]$ of 0.47 dl/g as measured in decalin at 135° C. and a softening point of (TMA) 148° C. Onto the substrate $Si_3N_4$ enhancement layers, Tb-Fe optical recording layers, and Ni alloy reflection layers were provided.

An information recording medium 1 was manufactured with the adhesive, and a weathering test was conducted. The test results are shown in Table 5.

EXPERIMENTAL EXAMPLE 2

A weathering test was conducted with an information recording medium manufactured similarly except that is used a hot melt adhesive containing 31% by weight of an ethylene/propylene/4-methyl-1-pentene terpolymer (ethylene/propylene/4-methyl-1-pentene=30/25/45 by weight %), 9% by weight of polystyrene having a glass transition of temperature (Tg) 110° C. and a melt flow rate (MFR 200° C.) of 25 g/10-minutes, and 60% by weight of petroleum resin having number average molecular weight of 2,000, a softening point of the adhesive being 148° C. and a melting viscosity of the adhesive being 250,000 cPs at 150° C. The results are shown in Table 5.

COMPARATIVE EXAMPLES 1 AND 2

Information recording mediums were manufactured in a similar manner of Experimental Examples except that is used an adhesive "Esdine 9000 #9145L" (trade name, from Sekisui Kagaku Kogyo Co., Ltd.) having a softening point of 125° C. (Comparative Example 1), and "EVER GRIP PS-01" (trade name, from AS-I Co., Ltd.) having a softening point 97° C. (Comparative Example 2). The test results are shown in Table 5.

TABLE 5

|  | Example 1 | Example 2 | Comparative Example 1 | Comparative Example 2 |
| --- | --- | --- | --- | --- |
| Softening point (°C.) of adhesives | 145 | 148 | 125 | 97 |
| Warpage (mrad) (phys. properties of products) | 3.6 | 2.8 | 6.7 | 10.8 |
| Appearance (phys. | No change | No change | Deviation took place | Deviation took place |

TABLE 5-continued

|  | Example 1 | Example 2 | Comparative Example 1 | Comparative Example 2 |
|---|---|---|---|---|
| properties of products) | was observed. | was observed. | between the disc substrates. | between the disc substrates. |

EFFECT OF THIS INVENTION

As stated hereinbefore, the information recording medium according to this invention is produced by laminating two disc substrates with a hot melt adhesive having a softening point of 130° C. or more, and therefore shows no deviation between the two laminated substrates and decreased deformation such as warpage.

What is claimed is:

1. In the information recording medium comprising two disc substrates, each substrate comprising a transparent resin substrate and a recording layer formed on one surface of said substrate, said disc substrates being laminated together with an adhesive so that the recording layers are disposed opposite to each other, the improvement which resides in that said adhesive is a hot melt adhesive having a softening point of 141° C. or more.

2. The information recording medium according to claim 1 wherein said adhesive comprises (A) from 1 to 60% by weight of a polyolefin, (B) from 1 to 30% by weight of a styrene resin and (C) from 30 to 95% by weight of a petroleum resin.

3. The information recording medium according to claim 1 wherein said information recording medium is an optical information recording medium.

4. The information recording medium according to claim 1 wherein said transparent resin substrate comprises a random copolymer of ethylene and a cycloolefin of the general formula [I]

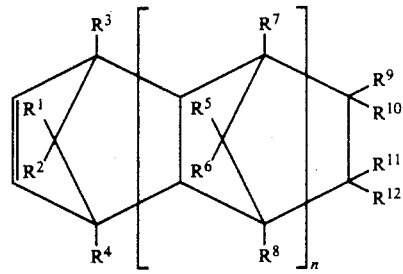

wherein n is 0 or a positive integer, and $R^1$ to $R^{12}$ are the same or different, and each represents a hydrogen or halogen atom or a hydrocarbon group, provided that $R^9$ to $R^{12}$, when taken together, may form a mono- or poly-cyclic hydrocarbon ring which may optionally have a double bond or bonds, or $R^9$ and $R^{10}$ or $R^{11}$ and $R^{12}$, when taken together, may form an alkylidene group, and having an intrinsic viscosity $[\eta]$ of from 0.01 to 10 dl/g as measured in decalin at a temperature of 135° C. and a softening temperature (TMA) of at least 70° C.

5. The information recording medium according to claim 2, wherein said polyolefin resin is a terpolymer of ethylene, propylene and an alpha-olefin.

6. The information recording medium according to claim 4, wherein said transparent resin substrate comprises a substantially linear copolymer of (a) from 50 to 75 mol % ethylene units and (b) from 25 to 50 mol % cycloolefin units arranged at random.

7. The information recording medium according to claim 4, wherein said transparent resin substrate further comprises a copolymer having a softening point of from −10° to 60° C. and an intrinsic viscosity ($\eta$) of 0.5 to 5 dl/g as measured in decalin at a temperature of 135° C.

8. The information recording medium according to claim 5, wherein said polyolefin resin comprises 10–70% ethylene units, 10–70% propylene units and from 10–80% by weight of $C_4$–$C_{20}$ alpha-olefin units.

9. The information recording medium according to claim 2, wherein the styrene resin (B) has a glass transition temperature of from 70° to 150° C. and a melt flow rate (ASTM D1238) at 200° C., 2.16 kg load of 0.1 to 50 g/10 minutes.

10. The information recording medium according to claim 2, wherein the petroleum resin (C) has a number average molecular weight of 50 to 3000.

* * * * *